Dec. 9, 1958

A. F. SCHUMANN 2,863,500

FLUID FUEL BURNERS

Filed Feb. 4, 1952

INVENTOR.
ALFRED F. SCHUMANN
BY
Woodcock and Phelan
ATTORNEYS

Dec. 9, 1958 A. F. SCHUMANN 2,863,500
FLUID FUEL BURNERS

Filed Feb. 4, 1952 7 Sheets-Sheet 5

INVENTOR.
ALFRED F. SCHUMANN
BY
Woodcock and Phelan
ATTORNEYS

Dec. 9, 1958

A. F. SCHUMANN 2,863,500

FLUID FUEL BURNERS

Filed Feb. 4, 1952

INVENTOR.
ALFRED F. SCHUMANN
BY
Woodcock and Phelan
ATTORNEYS

United States Patent Office 2,863,500
Patented Dec. 9, 1958

2,863,500

FLUID FUEL BURNERS

Alfred F. Schumann, Lower Merion, Pa., assignor to Hauck Manufacturing Co., Brooklyn, N. Y., a corporation of New York Application February 4, 1952, Serial No. 269,739

14 Claims. (Cl. 158—76)

This invention relates to mixing valves and particularly to burners in which air and fluid fuel (gaseous, liquid or both) are proportioned selectively to obtain an oxidizing, neutral or reducing, flame with fuels of widely different B. t. u. values and without need for substitution of parts.

In accordance with one aspect of the invention, gaseous fuel enters the combustion chamber of the burner tile tangentially into a zone of relative quiescence and of low positive or negative pressure throughout the entire range of combustion air moving axially of the chamber so to maintain combustion even though the velocity of air entering the chamber may be far in excess of the flame-propagation velocity of the gas and even though the velocity of gas entering the chamber may be very low.

In accordance with another and related aspect of the invention, the control elements for the air and fuel valves are coupled by a mechanical linkage which provides for their concurrent adjustment to predetermined proportional extents so substantially to maintain a selected ratio of air to fuel throughout the range of adjustment of the burner.

More specifically, the linkage between the air valve and each fuel valve comprises two operating arms, rotatable about a common axis and respectively connected to the control elements of the valves, and a ratio lever which is pivotally connected to the rotatable control members and to a normally fixed or stationary fulcrum member whose pivotal connection is adjustable with respect to the other two pivotal connections for selection of a substantially fixed ratio between the extents of movement of the valve elements throughout the range of their concurrent adjustment.

This application is a continuation-in-part of copending application Serial No. 109,983 upon which has issued U. S. Letters Patent 2,672,190.

For a more detailed understanding of the invention, reference is made to the accompanying drawings, in which.

Figure 1:
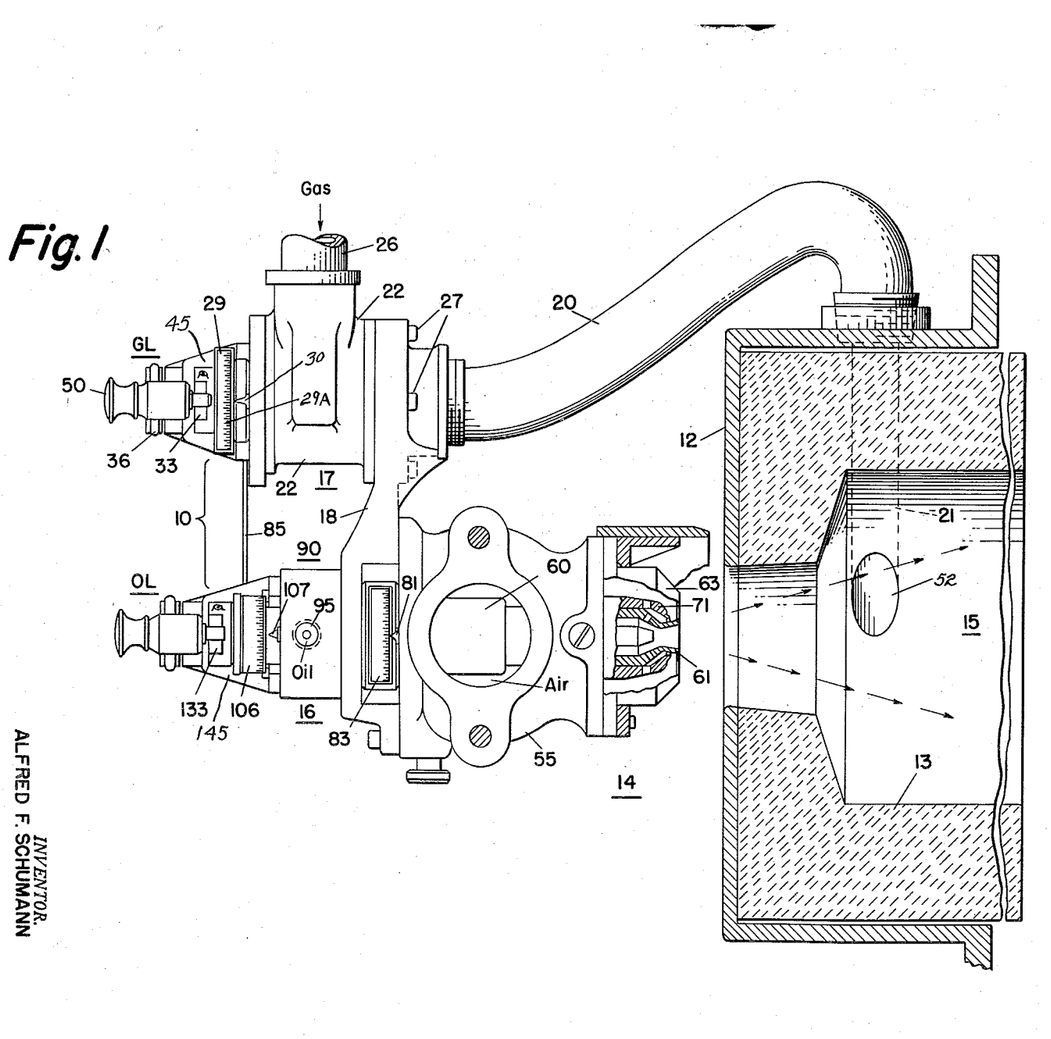
Fig. 1 is a top plan view, partly in section, of a burner for gaseous and liquid fuels.
Figure 2:
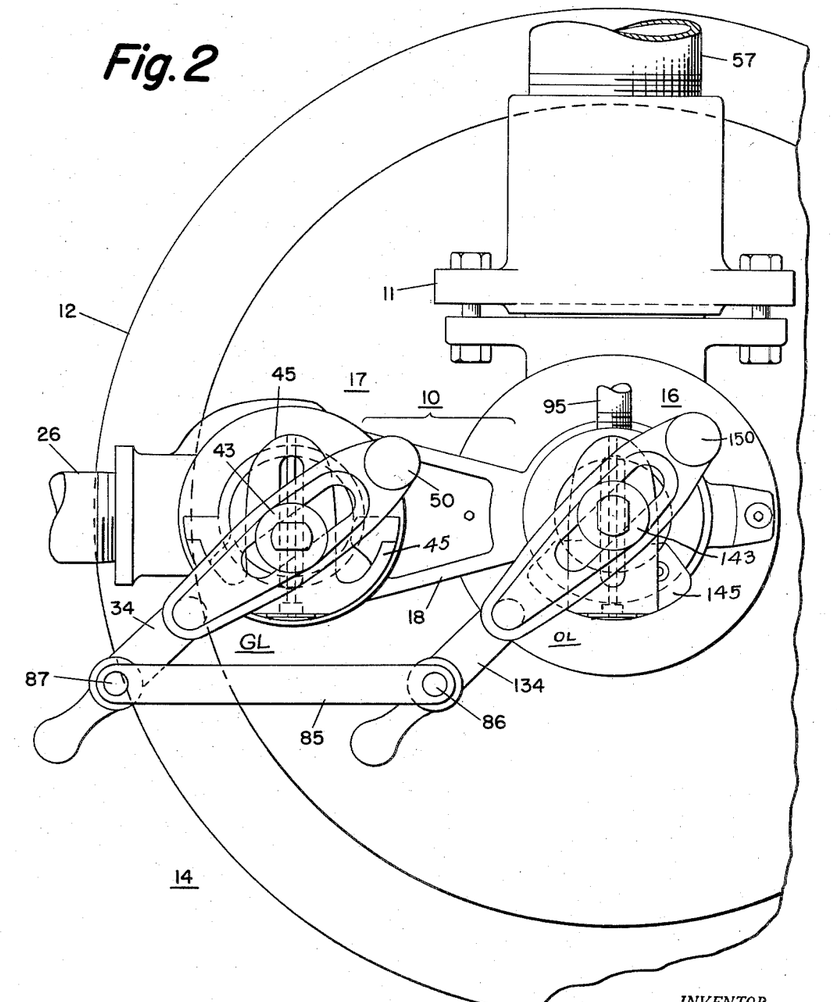
Fig. 2 is a partial front elevational view of parts appearing in Fig. 1.
Figure 3:
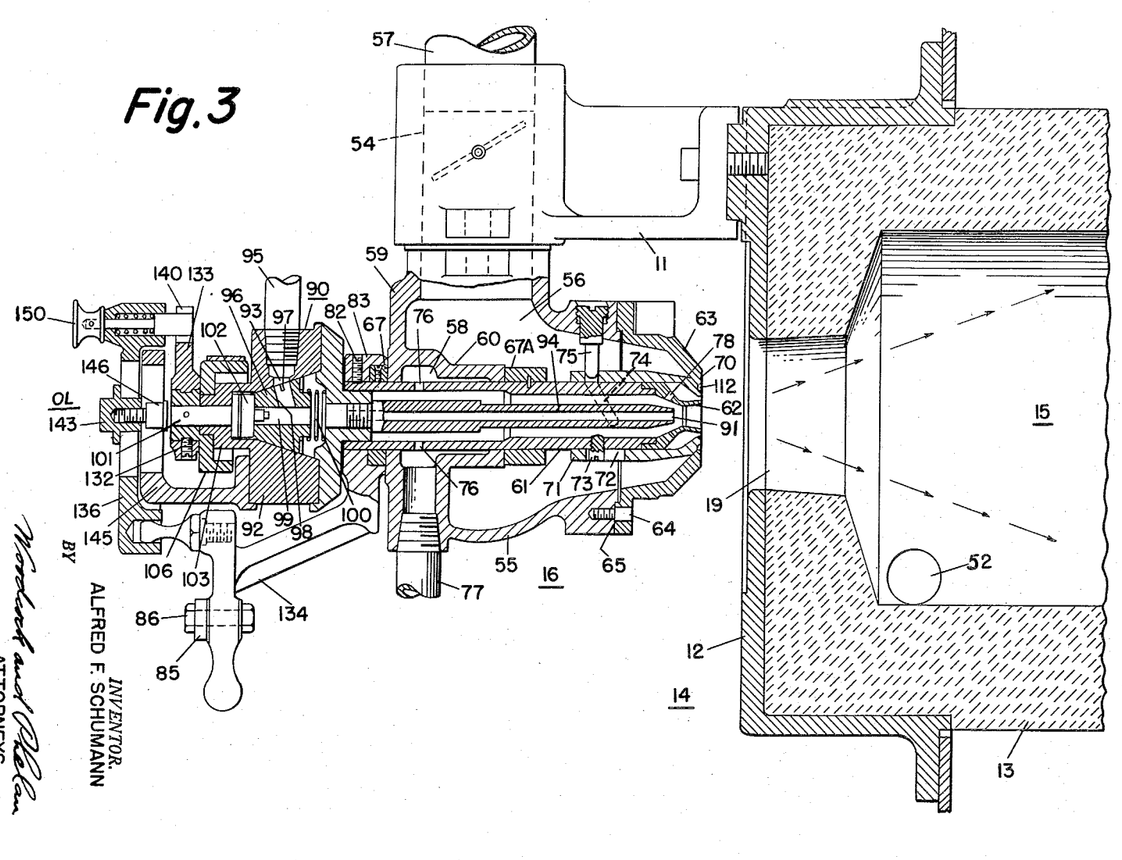
Fig. 3 is a side elevational view, principally in section, of parts appearing in Figs. 1 and 2.

Referring to Figs. 1 to 3, the combination-burner assembly 10 is mounted by bracket 11 upon the mounting plate 12 of the burner tile 13. The burner unit 14 comprising components 10—13 is mounted for use by fastening the mounting plate 12 to the wall of a furnace with the uncovered end of the burner tile projecting through a wall opening of the furnace so that products of combustion of the air-fuel mixture supplied to the combustion chamber 15 of the tile are discharged into the interior of the furnace.

The burner unit 14 is suited for burning liquid and/or gaseous fuel, and for such purpose the assembly 10 comprises two units 16, 17 attached to each other in precise spaced relation by bridge member 18. The unit 16, preferably and as shown, is in many respects similar to one disclosed in aforesaid application, Serial No. 109,983. As positioned by bracket 11, the liquid-fuel burner unit 16 supplies a stream of air, or a mixture of air and oil or other liquid fuel, to the inlet 19 of the combustion chamber 15. The stream moves axially of the combustion chamber generally in the form of a cone whose diameter increases in the direction of travel of the stream.

Figures 5, 6, 7, 9, 10, 11:
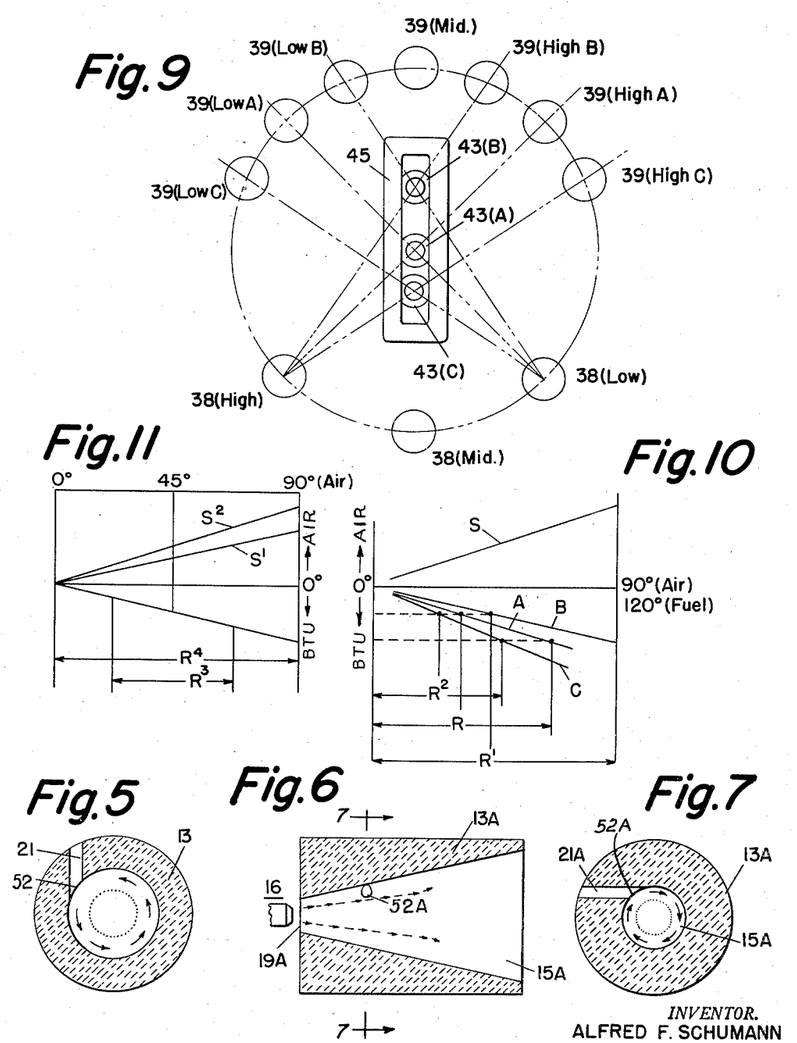
Fig. 5 is a front elevational view, in section and on reduced scale, of the burner tile of Figs. 1 and 3.
Fig. 6 is a side elevational view, in section, of a modification of the burner tile of Fig. 5.
Fig. 7 is a sectional view taken on line 7—7 of Fig. 6.
Figs. 9 to 11 are explanatory figures referred to in discussion of the adjustment of the linkages of Figs. 8 and 12.
Figure 8:
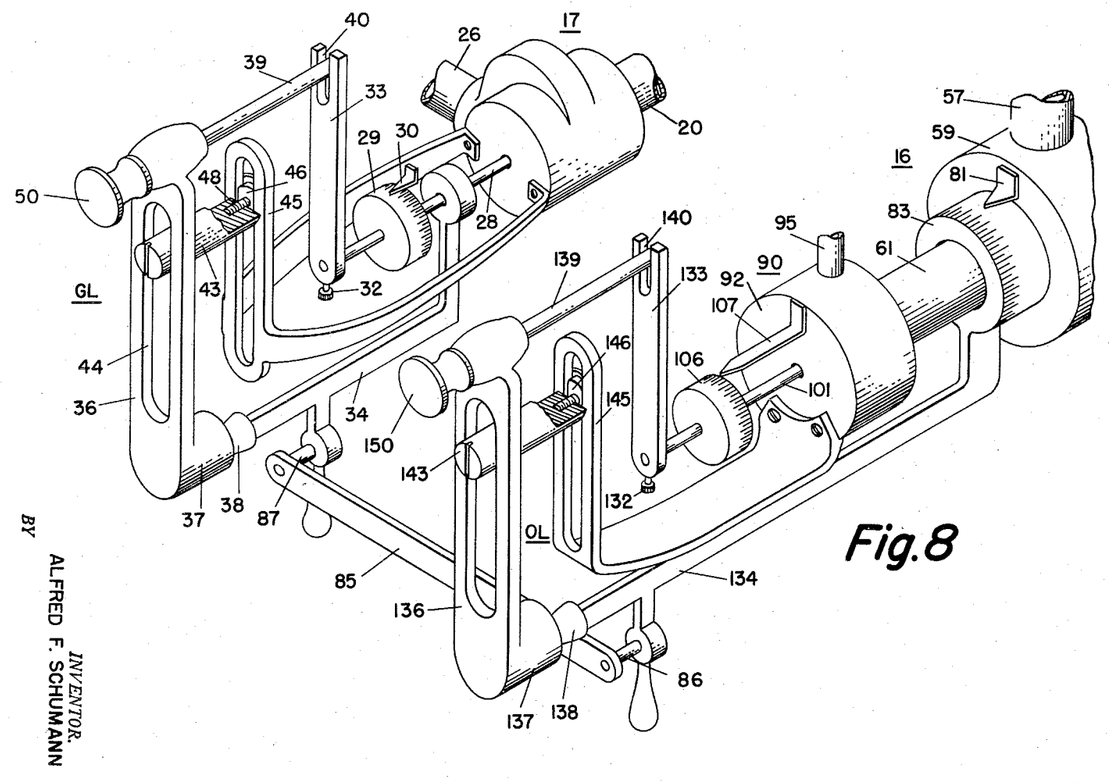
Fig. 8 is a perspective view of the operating linkage of the air and fuel valves shown in Figs. 1 to 4.

The gas unit 17 is connected by discharge pipe 20 to the passage 21 (Figs. 1 and 5) of the burner tile 13. As best shown in Fig. 5, the passage 21 discharges the gas tangentially of the combustion chamber of tile 13 through the gas inlet 52 so located that the fuel gas enters the combustion chamber in a region of relative quiescence; in fact there is a vacuum practically throughout the range of minimum to maximum flow of air because inlet 52 is outside of the boundary of the conical stream entering the combustion chamber through the axial inlet 19. By this arrangement, although air may be entering the combustion chamber at a velocity far in excess of the flame-propagation of the gas, and even though the gas may be entering the combustion chamber at very low velocities, combustion is nevertheless maintained. In short, combustion continues even though the air supplied is enormously in excess of the amount required for complete combustion.

This objective may also be obtained by substitution for burner tile 13 of Figs. 1 and 3 of the burner tile 13A of Figs. 6 and 7. In the latter, the combustion chamber 15A progressively increases in diameter from its air inlet 19A to its discharge end, the gas entering tangentially from passage 21A through opening 52A positioned sufficiently close to the air inlet that the entering gas first circulates in the combustion chamber outside of the air stream and is gradually entrained by the air stream as the gas spirals toward the discharge end of the chamber where it meets the expanding air stream cone. It is not necessary for the combustion chamber to have a setback, as provided by the abrupt change of diameter in Figs. 1 and 3: such setback, however, is more desirable because even at low air velocities it insures that the air-cone diameter is substantially less than the diameter of the combustion chamber at the point of tangential entry of the gas. Moreover, with the setback construction, the gas in the quiescent zone at the gas inlet 52 will continue to burn at the minimum setting of the air valve and so serve as a pilot flame without need for any additional structure.

Figures 4, 4A:
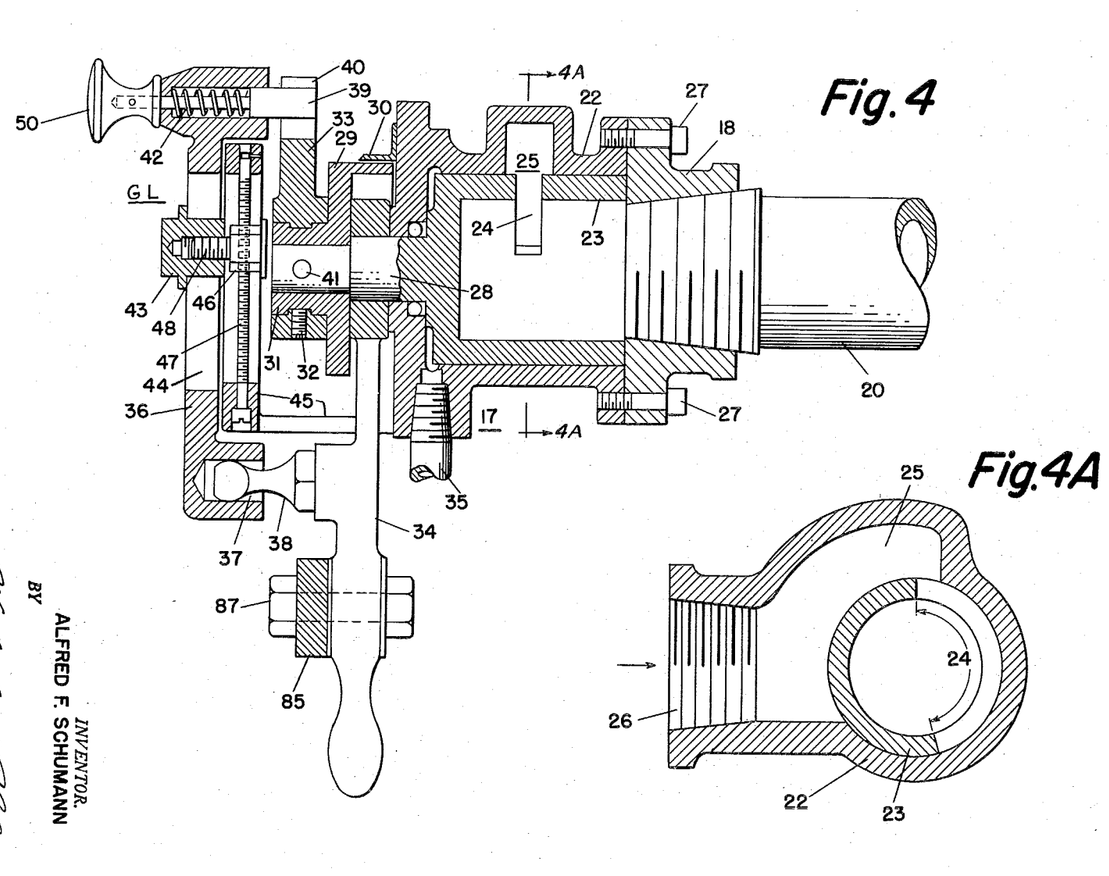
Fig. 4 is a side elevational view, in section, of the gas valve shown in Figs. 1 and 3.
Fig. 4A is a sectional view taken on line 4A—4A of Fig. 4.

The body or casing 22 of the gas unit 17 has a cylindrical recess or bore which closely fits the rotatable sleeve 23 (Figs. 4 and 4A) having a slot port 24 cooperating with the body passage 25 from the gas inlet 26 to provide an opening of variable area to the interior of the sleeve 23. As shown in Fig. 4, the body 22 of the gas valve is held, as by machine screws 27, to the bridge member 18 with the interior of the valve sleeve 23 in communication with the receiving end of pipe 20 threadably received by the bridge 18. The valve port 24 is of rectangular shape so that the effective area of the port varies as a linear function of the angular position of the sleeve 23.

The closed end of valve sleeve 23 is provided with a stem 28 which extends through the valve casing and to which is attached, as by pin 41, a drum 29 having thereon a scale 29A (Fig. 1) cooperating with an index 30 on the valve casing. To the hub 31 of drum 29 (Fig. 4) is adjustably attached, as by set screw 32, the operating arm 33 of the valve sleeve 23. The adjustment afforded by set screw 32 permits an operator to select a predetermined angular relation between the position of valve sleeve 23 and the corresponding position of its operating arm 33. The fitting 35 permits grease to be forced into the interior of valve casing 22 for lubrication and sealing purposes.

With the gas valve construction as thus far described, the rate at which gas is supplied to the burner tile for a given gas pressure varies as a linear function of the angular position of the operating arm 33. This linearity obtains for the different angular relationships between valve sleeve 23 and arm 33 which are selectively afforded by set screw 32 or equivalent. As later appears, the angular position of arm 34, freely rotatable about the axis of the stem 28 of valve sleeve 23, corresponds with the air setting of the burner. To accommodate the burner for use with many gases such as blast-furnace gas, coke-oven gas, natural gas, propane and butane varying widely in B. t. u. value per cubic foot or unit of volume and to provide for any desired degree of combustion varying from strongly oxidizing through neutral to strongly reducing over a wide range of input, the arms 33, 34 are interconnected by a linkage which as later described may be adjusted to select any desired ratio of the angular movements of the gas and air valves throughout their range of concurrent adjustment. As more fully shown in Figs. 3 and 6 of my aforesaid copending application, Serial No. 109,983, the air and fuel valves individually have different ranges of adjustment: specifically, the range of individual adjustment of the fuel valve may be of the order of 180°, whereas the lesser individual range of adjustment of the air valve may be of the order of 90°.

In the particular linkage GL shown in Figs. 1, 2, 4 and 8, the lower end of link or lever 36 is provided with a socket 37 for receiving the pivot pin 38 extending from air-control arm 34. The upper end of link 36 is provided with a pivot pin 39 which is slidably received by slot 40 in fuel-control arm 33. Pin 39 may be retracted, against the biasing spring 42 (Fig. 4), by pulling knob 50. The fulcrum for lever 36 comprises a pivot pin 43 extending through slot 44 in lever 36 and adjustably held in the slotted stationary bracket 45. In the specific construction shown in Fig. 4, the pivot pin 43 extends from block 46 whose adjustment radially of the common axis of rotation of arms 33, 34 may be nicely adjusted by screw 47. Whether such screw is provided as in Fig. 4, or omitted as in Fig. 8, the fulcrum block 46 is locked in adjusted position by turning the pivot pin 43 on a threaded extension 48 of block 46 tightly to engage the bracket 45.

A preferred procedure for adjusting the burner is as follows: before any adjustment of fulcrum 43, the starting point of the gas orifice is adjusted to correspond with the minimum air setting. This is done by loosening set screw 32, setting gas dial 29 to give the desired character of flame with arm 34 in minimum air setting and then re-tightening the set screw 32. Then the fulcrum 43 is adjusted to give the gas valve range which maintains the desired character of the flame throughout the range of adjustment of the air valve.

Assuming the fulcrum 43 is secured to bracket 45 midway of the distance between pivot pins 38, 39 of link 36 (position 43A, Fig. 9), the ratio of the angular movements of arms 33, 34 respectively connected to the gas and air valves is 1 to 1. More specifically, as the air-control arm 34 is moved from "Low" to "High," the pivot pin 38 moves from right to left through an angle of 90° and pivot pin 39 of the gas-control arm 33 is moved from left to right through an angle of 90°. In other words, for this setting of fulcrum 43, as the pivot 38 of the arm 34 is swung through an angle of 45° to the right (or left) from its "Mid" position (Fig. 9) to adjust the air, the pivot 39 of the fuel control is concurrently moved through an angle of 45° to the left (or right) from its "Mid" position. Assuming the fulcrum 43 is reset to position 43B, Fig. 9, movement of the air-control arm from "Low" to "High" now results in adjustment of gas-control arm 33 through an angle of only 45° (from position "Low B" to position "High B"): i. e., for each one degree movement of gas arm 33, there is practically a two degree movement of air-arm 34. For this setting of fulcrum 43, as the pivot 38 of arm 34 is swung through an angle of 45° to the right (or left) from its "Mid" position (Fig. 9) to adjust the air, the pivot 39 of the fuel control is concurrently moved through an angle of 22.5° to the left (or right) from its "Mid" position. If, on the other hand, the fulcrum 43 is reset to position 43C, Fig. 9, the pivot 39 to the gas arm 33 moves through an angle of 120° for the 90° movement of pivot 38 of the air-arm 34: i. e. practically 1° of movement of the air-control arm is effected concurrently with each 1⅓° of movement of the gas-arm 33. For this setting of fulcrum 43, as the pivot pin 38 of arm 34 is swung through an angle of 45° to the right (or left) from its "Mid" position (Fig. 9) to adjust the air, the pivot pin 39 of the fuel control is concurrently moved through an angle of 60° to the left (or right) from its "Mid" position. From these few examples, it will be understood that the ratio of air to gas may be selected to obtain any desired degree of combustion to produce a flame which is either neutral, oxidizing or reducing and that by adjustment of fulcrum 43 the selected ratio can be closely maintained throughout the range of burner adjustment, the neutral, oxidizing or reducing nature of the flame remaining substantially unaffected by the change in burner setting. As shown in Fig. 9 for example, the fulcrum 43 is adjustable in a plane which substantially bisects the angular range of 90° through which the air-control arm is movable and which also substantially bisects all of the various angular ranges through which the coupled fuel-control arm is concurrently movable.

Referring to Fig. 10 by way of supplemental explanation, the relationship between the amount of air and the position of air-control arm 34 (for any given supply pressure) is represented by straight line S, i. e., the amount of air discharged is substantially a linear function of the air valve setting. As previously pointed out, the amount of fuel discharged is a substantially linear function of the fuel-valve setting. It is also assumed that for a particular fuel, the gas valve arm 33 should be concurrently adjusted over a range "R" of 90° for adjustment of the amount of fuel in accordance with the corresponding B. t. u. curve A. In such case, the fulcrum pin 43 is adjusted to position 43A midway of the pivot pins 38, 39 so that as above described, a change in setting of 1° of the air-control lever 34 corresponds with a concurrent change in setting of 1° of the gas-control lever 33 through the range of settings of the burner.

If a gas having less B. t. u.'s per unit volume is used, the proper relation between the range of adjustment of the gas valve 23, or equivalent, and the amount of gas passed by it may correspond with curve B (Fig. 10). As apparent from Fig. 10, a much wider range (R') of adjustment of the gas valve is required than before for the same range of adjustment of the air valve. Accordingly, the fulcrum 43 is moved closer to pivot 38, for example, to position 43C of Fig. 9. Conversely, if a richer fuel is used, the proper relation between the range of adjustment of gas valve 23 and the amount of gas passed by it may correspond with curve C (Fig. 10), in which case fulcrum 43 is adjusted to a position closer to pivot pin 39, for example, to position 43B for adjustment of the gas valve over range $R^2$ as the air valve moves from its minimum to maximum settings.

As the fulcrum 43 is adjustable to any position over a wide range, the burner is suited for, and has been used with, gases of widely varying B. t. u. value, such as blast furnace gas, natural gas, propane and butane.

Generally speaking, for perfect combustion of all fuels, one cubic foot of "free" air (i. e. measured at atmospheric pressure) is required for each one hundred B. t. u.'s. The following table indicates the approximate B. t. u. value of several gases and the fuel/air ratio required for complete or perfect combustion (neutral flame).

| Gas | Value, B. t. u. cu. ft. | Ratio |
| --- | --- | --- |
| Blast furnace gas | 100 | 1:1 |
| City gas | 500 | 1:5 |
| Natural gas | 1,000 | 1:10 |
| Propane | 2,500 | 1:25 |
| Butane | 3,200 | 1:32 |

The position of fulcrum 43 may also be shifted to adapt a given installation for use with air sources of different pressures. Assume, for example, that curve S1 (Fig. 11) represents the relation between the setting of air-control arm 34 and the amount of air supplied to the burner tile and that complete combustion (neutral flame) is obtained when the gas valve is adjusted through range $R^3$ of 90°. If the air pressure is increased so that the air curve becomes $S_2$, the fulcrum point 43 of link 36 is reset to effect adjustment of the gas valve over extended range $R^4$, of say 120° for 90° movement of the air-control arm 34.

The provision of linkage GL, or of the equivalent linkages subsequently described, permits a burner of given size and construction to be used with different gaseous fuels, with different available air supplies and in all cases to obtain a flame which to any desired extent is oxidizing, reducing or neutral. Furthermore, when the gas is tangentially introduced in a zone of quiescence of the combustion chamber, as previously described, fuel whose ratio of air to fuel for perfect combustion is as low as 1 to 1 or as high as 32 to 1 can be burned without any physical change of the tile or of the air or gas passages. As above stated, combustion can be maintained when the air is enormously in excess of that required for perfect combustion.

The unit 16 of Figs. 1 and 2 for supplying air, or air and liquid fuel, to the burner tile is best shown in Fig. 3, and in most respects is or may be similar to that described and claimed in my aforesaid copending application.

The casing 55 of unit 16 is provided with a main chamber 56 which receives air at constant pressure from an air supply line 57 received by bracket 11 of the combination-burner assembly 10. The butterfly-valve passage 54 in the bracket 11 provides communication between chamber 56 and air line 57 so that the bracket 11 also serves as an air-coupling to burner unit 16 of the sub-assembly 16, 17. The casing 55 is also provided with an auxiliary air chamber 58 in part defined by the front wall 59 of the casing and by internal wall structure 60 thereof. The inner air nozzle 61 is rotatably received by aligned openings in wall structures 59, 60 of casing 55 and extends through the main air chamber 56 with its discharge tip 62 within the outer air nozzle 63.

The outer air nozzle 63 extends from the rear wall 65 of housing 55 and is attached thereto as by bolts 64. As the outer nozzle is attached to casing 55, in turn attached by bracket 11 to the cover plate 12 of the burner tile 13, the spacing between the tip of the outer air nozzle and the tile opening 19 is fixed. The distances from the discharge end of the inner air nozzle to the discharge end of the outer air nozzle and to the tile opening 19 are also invariable: specifically, the collar 67 secured to the inner nozzle 61 bears against the outer face of the front wall 59 of casing 55 and the collar 67A attached to nozzle 61 bears against the face of the internal wall 60 to preclude any axial (longitudinal) movement of inner nozzle 61.

The effective cross-sectional area of the discharge passage from air chamber 56 between the tips of the inner and outer air nozzles is variable by a sleeve 71 provided with a longitudinally extending slot 72 which receives a pin 73 extending from inner nozzle 61 and a spiral or angularly extending slot 74 which receives a pin 75 extending inwardly from the upper wall of casing 55.

Thus, as the inner nozzle 61 is rotated in one direction or the other, the sleeve 71 is moved axially along the inner nozzle 61 to vary the cross-sectional area of the annular passage or orifice between the forward end of the sleeve and the stationary tip 70 of the outer nozzle. The angle of slot 74 is so chosen, in the particular valve illustrated, that 90° rotation of the inner nozzle corresponds with full travel of the sleeve 71. This rotation of the inner nozzle 61 is effected by arm 134 whose hub 83 receives the external end of nozzle 61 and is attached thereto as by set screw 82.

The scale on hub 83 (Fig. 1) cooperates with the index 81 attached to the front wall 59 of the valve casing 55. The scale is linear and may be calibrated in arbitrary numerical units or may, for a particular installation using a fixed air pressure, be calibrated in units of weight of air per minute. The liquid-fuel burner 16 is of low pressure type using, for example, a supply source pressure within the range of from about 8 to 32 ounces.

The operating arm 134 of the air-control valve described is connected by link 85 (Figs. 1, 2 and 8) to the arm 34 of the gas valve unit 17. The radial distance from pivot 86 of link 85 to the axis of rotation of arm 134 is equal to the radial distance from pivot 87 to the axis of rotation of arm 34 so that as previously described and discussed in connection with Figs. 9 to 11, a 90° movement of arm 34 of gas valve unit 17 corresponds with the range of movement of the air valve arm 134 controlling supply of air to the burner tile. Furthermore, with the air-valve construction described, the relationship between the amount of air discharged is substantially a linear function of the angular movement of the air nozzle 61 and of the arms 134 and 34 so that there obtains the linear relationships exemplified by curves S, $S_1$, $S_2$ of Figs. 10 and 11.

For supplying liquid fuel, as oil, to the combustion chamber of the burner tile in addition to or in lieu of gaseous fuel, the burner unit 16 is provided with a fuel nozzle 94 (Fig. 3) disposed within the inner air nozzle 61 and having its discharge end or tip 91 near the discharge tip of the inner air nozzle for atomization of the oil by air from auxiliary chamber 58. This atomizing air which enters the nozzle 61 from chamber 58 through the ports 76 may be supplied from auxiliary air line 77 or from the main chamber 56 as in aforesaid application Serial No. 109,983. As the positions of the fuel and air nozzles of unit 16 remain fixed with respect to each other for all settings of the burner, the shape of the flame as effected by the pressure of air supplied to chamber 58 is not appreciably affected by adjustment of air-nozzle sleeve 71 by the control arms 34, 134. This is of importance not only when air and liquid fuel is supplied to the combustion chamber, but also when gaseous fuel is supplied, alone or in addition to liquid fuel, as it insures that for all burner settings the gas will enter the burner tile in a zone of quiescence outside of the stream of air, or air and liquid fuel, entering the combustion chamber through inlet 19.

The valve 90 for controlling admission of oil to nozzle 94 includes a housing or casing 92 having a conical chamber in communication through inlet port 93 with the fuel line 95 which supplies the liquid fuel at constant pressure. The chamber receives a conical valve member 96 having a peripheral groove 97 of rectangular cross-section which progressively increases in depth and terminates in a radial passage 98 of substantially larger cross-sectional area. Passage 98 extends to the bore 99 of valve member 96 and so provides for flow of oil from supply line 95 to the axial bore of the fuel nozzle 94 in amount depending upon the annular setting of valve member 96. The arcuate length of groove 97 is substantially in excess of 90°.

As passage 97 is of rectangular cross-section, the relationship between the angular position of valve member 96 and the amount of oil passed by it is linear. An advantage of the rectangular peripheral groove is that such linear relationship obtains even through in machining or honing, to final dimensions, there are inevitable differences in arcuate length of the groove 97 of different valve members 96. The width of port 93 (axially of valve member 96) is somewhat greater than the width of groove 97 to accommodate inevitable differences in machining of the valves and seats.

The valve member 96 is free or floating to insure it is always properly seated. Specifically, it is biased into seating engagement by spring 100 and is connected to the valve stem 101 through a floating coupling 102 which insures angular correspondence of the positions of the valve stem and valve member while permitting their relative axial movement.

To the forward end of stem 101 which projects beyond the boss 103 of valve casing 92 is attached, as by a set screw not shown, an "oil" dial drum 106 for cooperating with index 107 (Figs. 1, 8) attached to or marked upon the front wall of housing 92. The arm 133 for actuating the valve member 96 is fastened, as by set screw 132, to the hub of dial drum 106.

The proportioning linkage OL (Figs. 1, 2, 3 and 8) between the air-control arm 134 and the oil-control arm 133 of unit 16 is structurally the same as the proportioning linkage GL previously described as interconnecting the air-control arm 34 and the gas-control arm 33 of valve unit 17. For brevity, the proportioning linkage OL is not specifically described: its components not heretofore identified by different reference numbers are identified by the same reference numbers plus 100 as used to identify the corresponding components of linkage GL.

Thus, fulcrum 143 (Fig. 8) of linkage OL can be adjusted to selected rates between concurrently effected changes in settings of the oil and air control arms 133, 134 which affords the desired nature of the flame, the ratio remaining substantially fixed through the range of adjustment of the burner. The discussion of Figs. 9, 10 and 11 in connection with adjustment of fulcrum 43 of linkage GL is similarly applicable to adjustment of fulcrum 143 of linkage OL and need not be repeated. It is to be understood that when gas and oil are simultaneously used, the ratio between the movements of the air and oil valves is different from the ratio between the movements of the air and gas valves and accordingly the fulcrums 43, 143 have different settings. For perfect combustion, the adjustment of the linkages is such that throughout the range of burner settings one cubic foot of air is supplied for each 100 B. t. u.'s of the combined fuel. Thus, as the air-control arm 34 or 134 is moved to change the burner setting, the gas-control arm 33 and the oil-control arm 133, are concurrently moved each in a selected ratio to the change in air.

Reverting to Fig. 3, when the sleeve 71 approaches or is in the minimum air position shown, the ports 78 of the inner air nozzle are effective to provide high velocity air at the annular opening about the tip of nozzle 62 for good atomization of oil at minimum burner settings.

In each of the proportioning linkages GL and OL, the lever (36, 136) which interconnects the air-control and fuel control arms has a fixed pivotal connection to the air-control arm, a sliding pivotal connection with the fuel-control arm, and the fulcrum is adjustable. Either or both of these linkages may be replaced by generically similar linkages of which it is characteristic that at least one of the pivotal points must be fixed, at least two must be slidable, and the proportional movement variable from one to another ratio by changing the position of the pivotal point of the fulcrum relative to the others.

Figure 12:
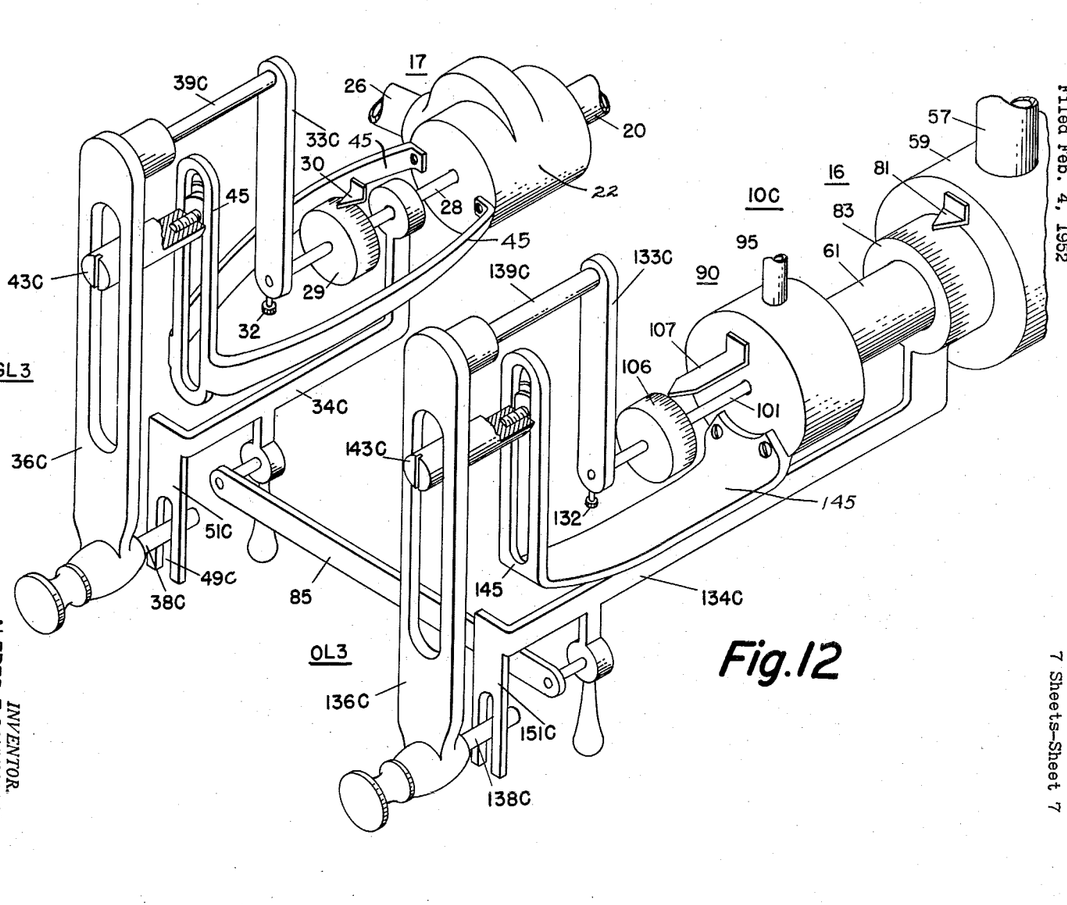
Fig. 12 is illustrative of a proportioning linkage which is a modification of that shown in Fig. 8.

For example, in the modification shown in Fig. 12, the position of pivot 39C is fixed relative to arm 33C and link 36C and pivot 38C effects a sliding pivotal connection between link 36C and arm 34C. For the latter purpose, the pivot 38C may have a fixed position relative to arm 36C and slidably engages slot 49C in extension 51C of arm 34C: alternatively, a releasably clamped pin and double-slotted arm arrangement may be used. The ratio of concurrent movements of arms 33C, 34C may be changed as in Fig. 8 by shifting the position of fulcrum 43C. The linkage OL3 connected to linkage GL3 by link 85 may be of similar construction and need not be separately described particularly as corresponding elements are identified by the same reference numerals plus 100. In other respects, burner assembly 10C is or may be similar in construction and operation to burner assembly 10 of Figs. 1 to 4, and further description thereof is unnecessary.

It shall be understood that all features of the invention, though jointly and individually of particular advantage in a burner construction suited for gaseous and liquid fuels, are capable of other applications: for example, the proportioning linkages may be used for purposes other than actuating the air and fuel valves of a burner.

What is claimed is:

1. A burner comprising an outer air nozzle, an inner air nozzle rotatably mounted within said outer nozzle, a fuel nozzle within said inner air nozzle, a valve controlling supply of fuel to said fuel nozzle and having an element rotatable about the axis of rotation of said inner air nozzle, a sleeve slidable axially of said inner air nozzle upon rotation thereof for varying the discharge of air from said outer air nozzle, a pair of actuating arms respectively attached to said inner air nozzle and said valve element, a link interconnecting said arms for concurrent angular adjustment thereof, and an adjustable fulcrum for said link, said fulcrum being adjustably preset in a line extending through said axis and substantially bisecting the angular ranges through which said arms are concurrently adjustable for selectively changing the relative movement when concurrently adjusting said sleeve and valve element.

2. A burner comprising two elements rotatable about a common axis respectively to vary admission of air and fuel, a pair of actuating arms respectively attached to said elements for angular movement about said common axis thereof, a link interconnecting said arms for adjustment in unison through angular ranges on opposite sides of said common axis, a stationary bracket member, and a fulcrum member for said link securable to said bracket member at any of various selected positions in a line extending through said axis and substantially bisecting said angular ranges through which said actuating arms are concurrently adjustable for selectively changing their relative movement during their concurrent adjustment.

3. A burner comprising two elements rotatable about a common axis to vary admission of air and fuel, a pair of actuating arms respectively attached to said elements for angular movement about said common axis thereof, a slotted link pivotally attached to one of said arms on one side of said axis and slidably engaging the other of them on the other side of said axis for concurrent adjustment of said elements in angular ranges on opposite sides of said axis, a stationary bracket member, and a fulcrum member slidable in said slotted link and securable to said stationary member at any of various positions in a line which extends through said axis and substantially bisects said angular ranges for selectively changing the relative movement when concurrently adjusting said air-varying and fuel-varying elements.

4. A burner comprising two elements rotatable about a common axis respectively to vary admission of fuel and air, a pair of actuating arms respectively attached to said rotatable elements for angular movement about said common axis thereof, a slotted link member pivotally attached to one of said arms on one side of said axis and slidably engaging the other of them on the other side of said axis for concurrent adjustment of said elements on opposite sides of said axis, a bracket member having a slot extending in a plane which substantially bisects the angular ranges of concurrent adjustment of said arms, and a fulcrum member slidably received by the slots of said link and bracket members and securable to the latter in any of various positions for selectively changing the relative movement of said arms when concurrently adjusting said air-varying and fuel-varying elements.

5. A burner comprising two elements rotatable about a common axis respectively to vary the admission of fuel and air, each as a linear function of the angular movement of the associated element, a pair of crank arms having equal radii and respectively attached to said rotatable elements for angular movement about said common axis on opposite sides thereof, a slotted link member pivotally attached to one of said crank arms on one side of said axis and slidably engaging the other of said arms on the other side of said axis, a stationary bracket member having a slot extending in a plane which substantially bisects the angular ranges of concurrent adjustment of said arms, and a fulcrum member slidably received by the slots of said link and bracket members and securable to the latter in any of various positions for selectively changing the relative movement of said crank arms when concurrently adjusting said air-varying and fuel-varying elements.

6. A mixing valve for producing a mixture of two fluids supplied thereto at constant pressure in substantially fixed and selected proportions over a wide range of valve settings comprising two valve elements rotatable about a common axis with respect to the stationary valve structure respectively to vary the discharge of said fluids each as a linear function of the change in its angular position, a pair of actuating arms respectively attached to said rotatable valve elements for angular movement about said common axis thereof, a slotted link member pivotally attached to one of said arms and slidably engaging the other of them to effect their concurrent adjustment, and a fulcrum member slidably received by said slotted link member and securable to said bracket member in any of various positions for selectively changing the relative movement of said actuating arms when concurrently adjusting said valve elements.

7. A burner comprising an air chamber housing, an outer air nozzle extending from said housing, a ported bearing member within said nozzle, a rotatable inner air nozzle extending through said housing and said bearing member into said outer air nozzle, said inner nozzle having tangential ports opening in said air chamber, a sleeve slidably keyed to said inner nozzle for rotation therewith and to said bearing member for sliding movement varying the area of the air discharge passage of the outer nozzle, a fuel nozzle within said inner air nozzle, a valve controlling supply of fuel to said fuel nozzle having an element rotatable about the axis of rotation of said inner air nozzle, a pair of arms respectively attached externally of said housing to said inner nozzle and to said valve element, a link connecting said arms for concurrent adjustment of said sleeve and valve element, a bracket secured to said housing, and a fulcrum for said link securable to said bracket in any of various positions for selectively changing the relative movement of said arms when concurrently adjusting said sleeve and said valve element.

8. A low pressure burner for producing an atomized mixture of fuel and air in substantially constant proportion over a wide range of burner settings comprising inner and outer air nozzles, a sleeve slidable along said inner nozzle to vary the area of the discharge orifice of said outer air nozzle, an air-control lever angularly adjustable externally of the burner through a range not substantially exceeding 90°, means disposed internally of the burner and mechanically coupling said sleeve and said air control level to effect successive equal changes of the volume of air passed by said orifice for successive equal angular movements of said air control lever, a fuel nozzle within said inner air nozzle, a fuel control valve having relatively rotatable elements shaped to effect successive equal changes of the volume of fuel passed by said fuel nozzle for successive equal angular adjustments of one of said elements, a fuel control lever attached to said one of said valve elements for adjustment externally of the burner through a range substantially exceeding 90°, said levers extending on opposite sides of a common axis of rotation, and a linkage interconnecting said levers on opposite sides of their said axis of rotation and including an intermediate fulcrum adjustably fixed in a plane substantially bisecting the angular range of adjustment of said air-control lever to effect concurrent change of air and fuel by concurrent adjustment of said levers with relative movement thereof selectively changed by the adjustment of said intermediate fulcrum.

9. A low pressure burner for producing an atomized mixture of fuel and air supplied at substantially constant pressures to the burner in substantially constant ratio over a wide range of burner settings comprising inner and outer air nozzles having their discharge ends in fixed spaced relation, a sleeve member slidable along said inner nozzle to vary the area of the discharge orifice of the outer nozzle, a fuel nozzle disposed within said inner air nozzle and having a discharge orifice formed by a biased valve member, a fuel valve for controlling supply of fuel to said fuel nozzle and including an adjustable valve member, angularly adjustable levers extending on opposite sides of a common axis of rotation and connected to said sleeve and valve members to effect linear change of air and fuel respectively, and a mechanical linkage interconnecting said levers to effect their concurrent angular movement and including a fulcrum adjustable in a line substantially bisecting the angular ranges of concurrent movement of said interconnected levers for selectively changing their relative movement when they are concurrently moved.

10. A proportioning linkage comprising two arms mounted for movement about a common axis and continuously extending from opposite sides thereof, structure for limiting the angular movement of one of said arms through a range not substantially exceeding 90°, a lever having pivotal connections to said arms on opposite sides of said axis, and a fulcrum having a pivotal connection to said lever intermediate its pivotal connections to said arms and in a plane substantially bisecting said range of movement of said one of the arms, two of said pivotal connections being slidable during concurrent angular movements of said arms and one of said pivotal connections being adjustably fixed for selectively changing the relative angular movement of said arms when they are concurrently moved about their said common axis.

11. A proportioning linkage as in claim 10 in which the slidable pivotal connections are respectively between the fulcrum and said lever and between the lever and one of said arms.

12. A proportioning linkage as in claim 11 in which the fulcrum is adjustably fixed for selectively changing said relative angular movement of the arms.

13. A proportioning linkage as in claim 10 in which said arms are connected respectively to two rotatable valve members and in which the angular position of at least one of said arms may be adjustably fixed relative to the angular position of the associated valve member for selection of the relative angular positions of said valve members at the limits of their respective concurrent movements.

14. A mixing valve comprising a first valve element rotatable through an angular range not exceeding about 90° to vary the flow of a first fluid as a linear function of the change of its angular position, a second valve element rotatable about the axis of said first valve element but through a greater angular range not exceeding about 180° to vary the flow of a second fluid as a linear function of the change of its angular position, a pair of control arms mounted for rotation about the common axis of said valve elements, means for connecting one of said control arms to said first valve element for movement of said arm in a corresponding angular range which is substantially bisected by a plane including said common axis, a fulcrum adjustably fixed in said bisecting plane, a link having colinear pivotal connections, two of said pivotal connections being to said control arms on opposite sides of said common axis and an intermediate pivotal connection being to said fulcrum, said link and pivotal connections providing concurrent movements of said control arms on opposite sides of said common axis, the extent of relative angular movement of said control arms during their concurrent movement being selectively varied by change of the adjusted position of said fulcrum in said plane, and means for releasably connecting the other of said control arms to said second valve element to permit presetting of the initial relative positions of said valve elements for a given setting of said one of said control arms and so to predetermine for a given setting of said adjustable fulcrum the limits within which the flow of said second fluid is varied concurrently with a preselected predetermined incremental change in flow of said first fluid within said range of rotation of said one of said control arms.

References Cited in the file of this patent

UNITED STATES PATENTS

| | | |
|---|---|---|
| 712,879 | Wilgus | Nov. 4, 1902 |
| 1,197,721 | Drago | Sept. 12, 1916 |
| 1,654,658 | McIlvaine | Jan. 3, 1928 |
| 1,655,246 | Schermuly | Jan. 3, 1928 |
| 2,197,904 | Terry | Apr. 23, 1940 |
| 2,215,983 | Smith | Sept. 14, 1940 |
| 2,219,118 | Schumann | Oct. 22, 1940 |
| 2,290,785 | Turpin | July 21, 1942 |
| 2,295,784 | Handley | Sept. 15, 1942 |
| 2,305,070 | Butler et al. | Dec. 15, 1942 |
| 2,402,435 | Newton | June 18, 1946 |
| 2,552,302 | Young | May 8, 1951 |
| 2,562,460 | Hopkins | July 31, 1951 |
| 2,588,423 | Simmons | Mar. 11, 1952 |
| 2,672,190 | Schumann | Mar. 16, 1954 |

FOREIGN PATENTS

| | | |
|---|---|---|
| 422,579 | Italy | June 20, 1947 |